US007006130B2

(12) United States Patent  (10) Patent No.: US 7,006,130 B2
Harshbarger, Jr. et al.  (45) Date of Patent: Feb. 28, 2006

(54) VISUAL CUE FOR DISPLAY TESTING HAVING ONE BIT RESOLUTION

(75) Inventors: John H. Harshbarger, Jr., 1065 Lower Bellbrook Rd., Xenia, OH (US) 45385; W. Michael Shores, Englewood, OH (US)

(73) Assignee: John H. Harshbarger, Jr., Xenia, OH (US)

( * ) Notice: Subject to any disclaimer, the term of this patent is extended or adjusted under 35 U.S.C. 154(b) by 72 days.

(21) Appl. No.: 10/135,959

(22) Filed: Apr. 30, 2002

(65) Prior Publication Data

US 2003/0001956 A1    Jan. 2, 2003

Related U.S. Application Data

(63) Continuation of application No. 09/853,231, filed on May 11, 2001, now abandoned.

(51) Int. Cl.
 *H04N 17/00* (2006.01)
 *H04N 17/02* (2006.01)
(52) U.S. Cl. ............... 348/189; 348/177; 348/178; 348/180; 348/184; 345/207; 351/222
(58) Field of Classification Search ........ 348/177–180, 348/189–191, 184, 552; 345/207; 351/211, 351/222–224, 237, 239; H04N 17/00, 17/02
See application file for complete search history.

(56) References Cited

U.S. PATENT DOCUMENTS

| 3,883,234 | A | * | 5/1975 | Lynn et al. ............... 351/224 |
| 4,611,893 | A | * | 9/1986 | Schrier ...................... 351/239 |
| 4,634,243 | A | * | 1/1987 | Massof et al. ............. 351/243 |
| 5,247,358 | A | * | 9/1993 | Richards ................... 348/191 |
| 5,298,993 | A | * | 3/1994 | Edgar et al. ............... 348/180 |
| 5,319,398 | A | * | 6/1994 | Weijland ................... 351/212 |
| 5,483,259 | A | * | 1/1996 | Sachs ....................... 345/600 |
| 5,598,235 | A | * | 1/1997 | Heijl et al. ................. 351/224 |
| 5,638,117 | A | * | 6/1997 | Engeldrum et al. ........ 348/179 |
| 5,670,985 | A | * | 9/1997 | Cappels et al. ............ 345/601 |
| 5,754,222 | A | * | 5/1998 | Day et al. .................. 348/184 |
| 5,786,803 | A | * | 7/1998 | Hernandez et al. ......... 345/600 |
| 5,912,723 | A | * | 6/1999 | Maddess .................... 351/246 |
| 5,946,075 | A | * | 8/1999 | Horn ......................... 351/246 |
| 5,995,162 | A | * | 11/1999 | Fujimori .................... 348/569 |
| 6,033,076 | A | * | 3/2000 | Braeuning et al. ......... 351/224 |
| 6,078,309 | A | * | 6/2000 | Chen et al. ................. 345/589 |
| 6,084,564 | A | * | 7/2000 | Ohara et al. ................ 345/20 |
| 6,100,886 | A | * | 8/2000 | Lin ........................... 345/709 |
| 6,122,002 | A | * | 9/2000 | Ohara et al. ............... 348/191 |
| 6,227,668 | B1 | * | 5/2001 | McKinnon et al. ......... 351/222 |

(Continued)

OTHER PUBLICATIONS

*DisplayMate for Windows*—Reference Manual, pp. 7-25 and 71-79. Copyright 1990-1997, Sonera Technologies.

(Continued)

*Primary Examiner*—Brian P. Yenke
(74) *Attorney, Agent, or Firm*—Baker & Daniels

(57) ABSTRACT

A display test system includes a symbol source and a controller connected to the symbol source for receiving a symbol in response to a testing event whereupon the controller causes the display to produce a first area having a first light intensity, and the symbol at a second light intensity within the first area. A viewer uses an input device to verify to the controller the ability to discern the difference in light intensities of the symbol and the first area by describing or identifying the symbol.

15 Claims, 9 Drawing Sheets

U.S. PATENT DOCUMENTS

| | | | |
|---|---|---|---|
| 6,259,486 B1 * | 7/2001 | Mahvi | 348/553 |
| 6,278,433 B1 * | 8/2001 | Narui | 345/581 |
| 6,337,675 B1 * | 1/2002 | Toffolo et al. | 345/77 |
| 6,392,657 B1 * | 5/2002 | Hilliard et al. | 345/589 |
| 6,450,643 B1 * | 9/2002 | Wilson | 351/223 |
| 6,618,045 B1 * | 9/2003 | Lin | 345/207 |
| 6,628,324 B1 * | 9/2003 | Onishi et al. | 348/177 |
| 6,633,330 B1 * | 10/2003 | Sugiura et al. | 348/188 |
| 6,677,988 B1 * | 1/2004 | Usami | 348/179 |
| 6,686,953 B1 * | 2/2004 | Holmes | 348/179 |
| 6,700,627 B1 * | 3/2004 | Yang et al. | 348/674 |
| 6,714,211 B1 * | 3/2004 | Yoshida et al. | 345/690 |
| 6,736,511 B1 * | 5/2004 | Plummer et al. | 351/224 |
| 6,847,395 B1 * | 1/2005 | Thomas et al. | 348/180 |
| 6,850,245 B1 * | 2/2005 | Murashita et al. | 345/589 |
| 2002/0021411 A1 * | 2/2002 | Wilson | 351/222 |
| 2002/0140816 A1 * | 10/2002 | McGrath et al. | 348/180 |

OTHER PUBLICATIONS

Radiation Physics, *Test Pattern for Video Displays and Hard-copy Cameras*, Radiology, vol. 154, No. 2, pp. 519-527, Feb., 1985.

MCM Electronics, Advertising Brochure, Feb. 2001.

Video Instruments, *Quality Assurance for Video Displays in Medical Diagnostic Applications*, May 15, 2000.

*Television Test Chart*, Visual Information Institute, Inc., EIA Format.

* cited by examiner

FIG_1

FIG_2

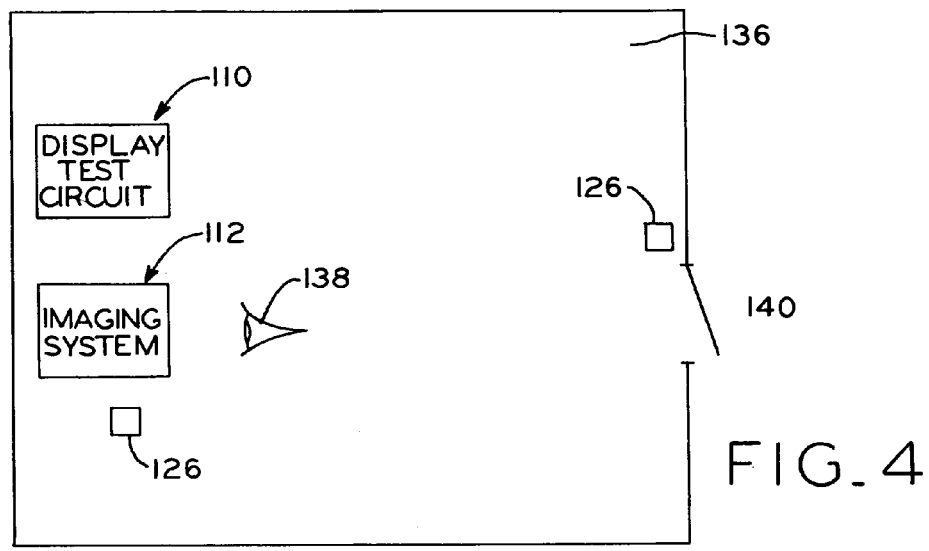
FIG_4
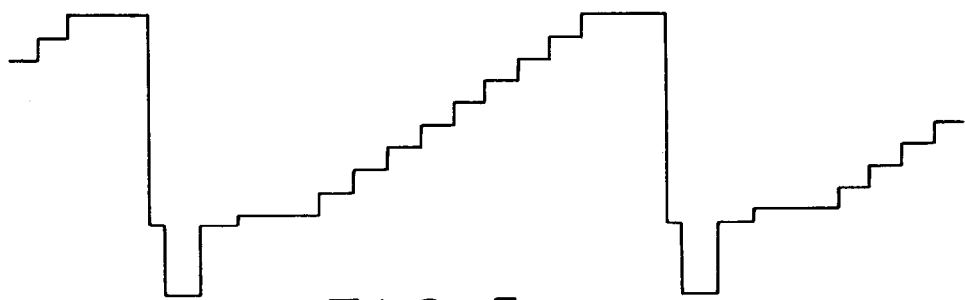
FIG_5
PRIOR ART
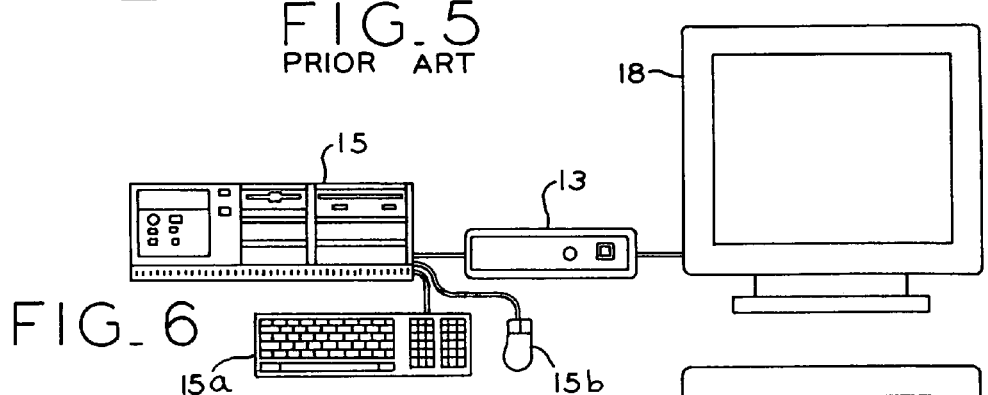
FIG_6
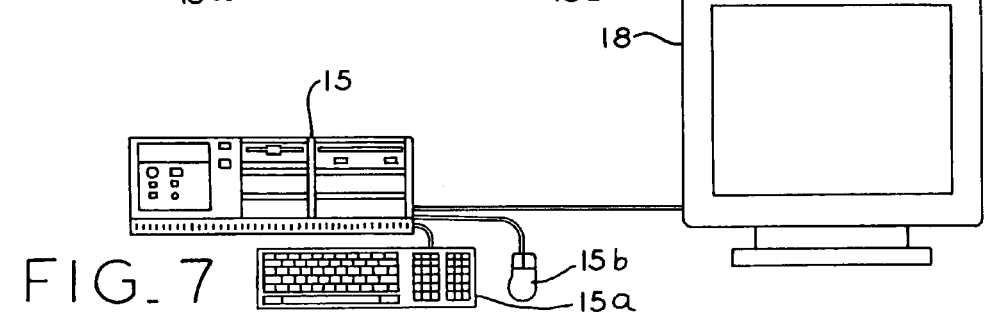
FIG_7

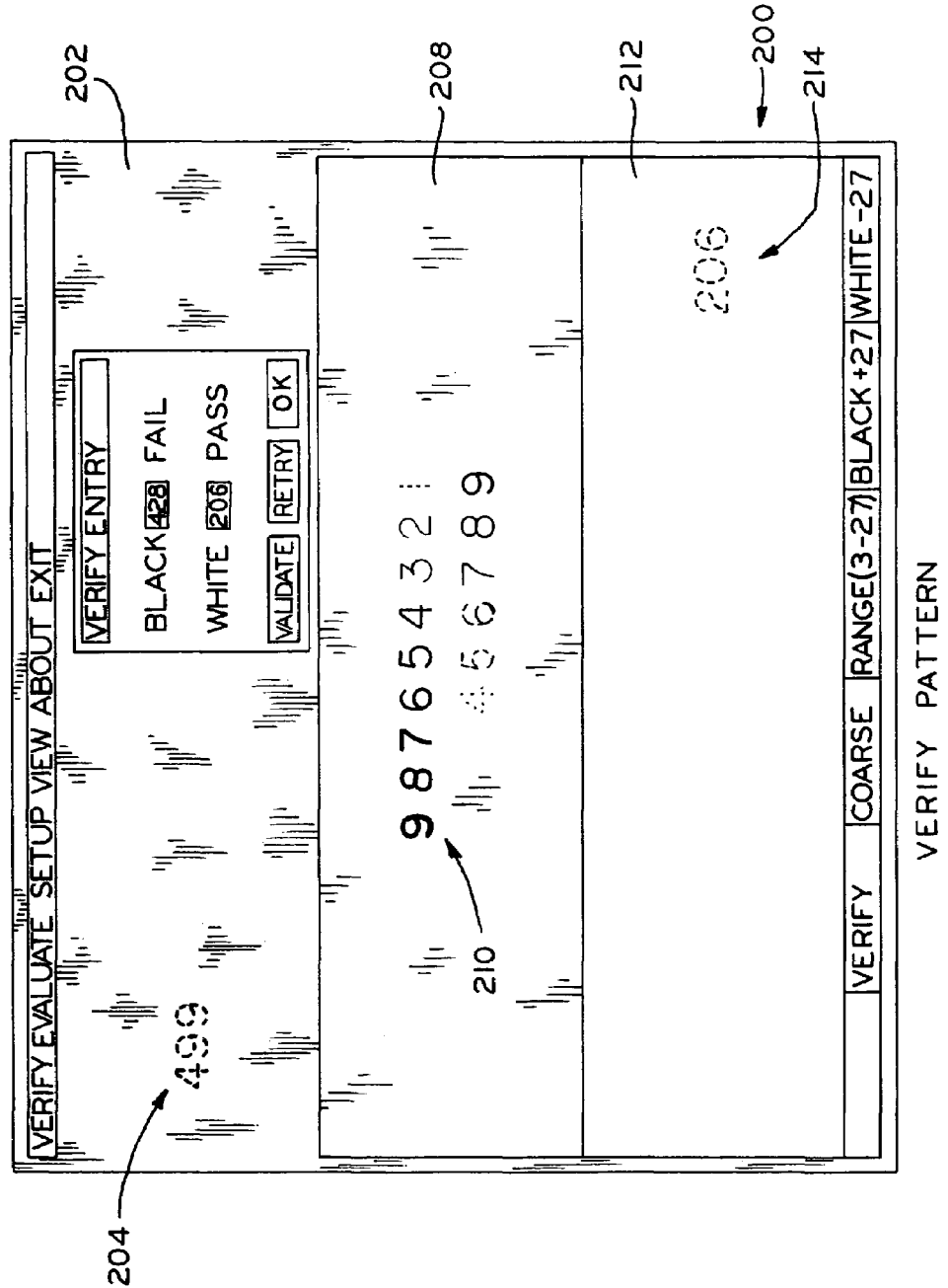
FIG_8

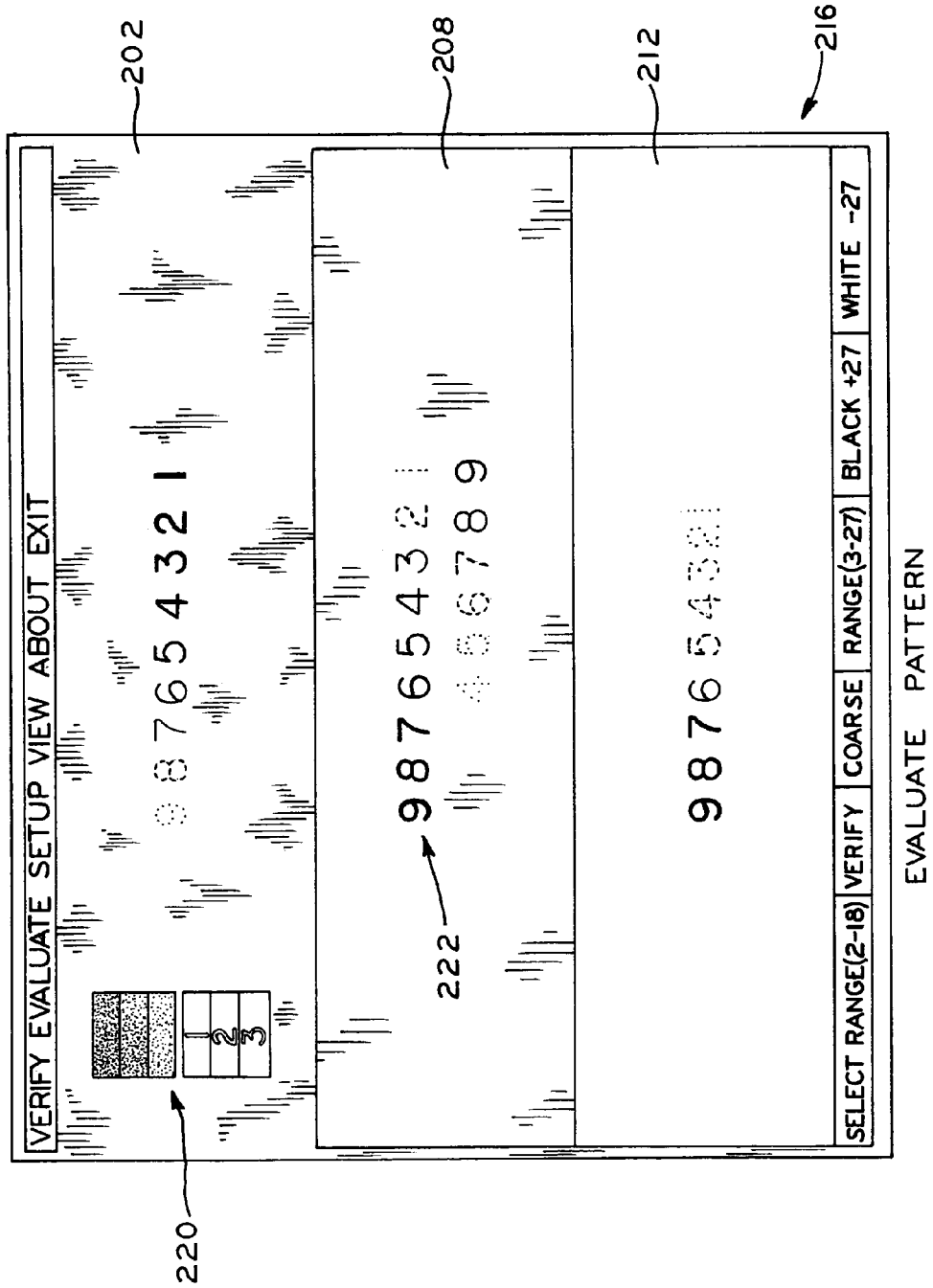
FIG_9

VISUAL CUE FOR DISPLAY TESTING HAVING ONE BIT RESOLUTION

CROSS-REFERENCE TO RELATED APPLICATION

This is a Continuation of application Ser. No. 09/853,231 filed May 11, 2001, now abandoned.

COMPUTER PROGRAM LISTING APPENDIX

Submitted with the application and incorporated by reference is a compact disk containing the following files:

| Java | |
| --- | --- |
| VuCue.java | 11 kb |
| CEvaluate.java | 4 kb |
| CLog.java | 5 kb |
| CPattern.java | 11 kb |
| CSetup.java | 5 kb |
| CVerify.java | 5 kb |
| LogViewer.java | 6 kb |
| SetValidate.java | 5 kb |
| StatusBar.java | 3 kb |
| AboutBox.java | 7 kb |
| C+ | |
| About.h | 2 kb |
| About.cpp | 2 kb |
| About.dfm | 16 kb |
| ContactBoxDlg.h | 2 kb |
| ContactBoxDlg.cpp | 1 kb |
| ContactBoxDlg.dfm | 3 kb |
| help.h | 2 kb |
| help.cpp | 3 kb |
| help.dfm | 2 kb |
| HelpFile.rtf | 26 kb |
| Log.h | 2 kb |
| Log.cpp | 9 kb |
| LogViewer.h | 2 kb |
| LogViewer.cpp | 9 kb |
| LogViewer.dfm | 4 kb |
| MainUnit.h | 3 kb |
| MainUnit.cpp | 17 kb |
| MainUnit.dfm | 4 kb |
| Patterns.h | 9 kb |
| Patterns.cpp | 13 kb |
| PWord.h | 2 kb |
| PWord.cpp | 2 kb |
| PWord.dfm | 2 kb |
| SVForm.h | 2 kb |
| SVForm.cpp | 2 kb |
| SVForm.dfm | 4 kb |
| VuCue.cpp | 4 kb |
| WarmFormDlg.h | 2 kb |
| WarmFormDlg.cpp | 1 kb |
| WarmFormDlg.dfm | 1 kb |

BACKGROUND OF THE INVENTION

1. Field of the Invention

The present invention generally relates to a device for testing video displays, and more particularly, to a test circuit and method for testing the performance of a display by providing a symbol on the display having an intensity which is slightly different from the background intensity, and requiring viewer to identify the symbol to verify adequate performance of the display.

2. Background of the Invention

Conventional video display devices are capable of providing high resolution, detailed images. Like other pieces of electronic equipment, however, the performance of such displays may degrade over time. The rate and degree of degradation may be such that the viewer fails to notice the overall reduction in performance. In some applications, a degradation in image quality is substantially inconsequential until the image has degraded to a point that is obviously unacceptable to the viewer. In other applications, however, this purely subjective approach to monitoring display performance is unacceptable. In military and medical applications, for example, the viewer must at all times be confident that the image content is accurate and properly displayed. Clearly, if the image is an x-ray image, the physician must be confident that variations in image content accurately reflect the target anatomy, and are not manifestations of degradations in display performance.

The conventional approach to display quality assessment involves observation of a complex reference image or test pattern. One industry standard pattern is the SMPTE pattern which was developed by a committee of the Society of Motion Picture and Television Engineers. By providing the SMPTE pattern on a display, a variety of performance parameters of the display may be assessed. As is well-known in the art, a viewer measurement device may assess parameters such as scan size, centering, geometry, resolution, aspect ratio, and brightness and contrast through observation or measurement of the displayed SMPTE pattern. The reference image approach, however, does not facilitate full display quality assessment by observation due the variability and adaptation in human vision. A variety of equipment and techniques exist which attempt to provide comprehensive analysis of electronically generated displays in a laboratory setting. None of these approaches, however, are adequately comprehensive or practical to implement as a standardized method of display assessment. These approaches are based on very technical aspects of display performance, without a relationship to viewability. While conventional approaches may permit performance comparison between different pieces of equipment, and a determination that display performance is at a certain level at a specific time, these approaches require use of expensive equipment, trained technicians, and time consuming analyses. None of these techniques are practical for use outside a laboratory environment to test the daily performance of a display device.

Assessment of the performance of a display device is complicated by the wide performance range of the human eye, its state of adaptation to the viewing environment, and the broad adjustment range available in modern displays. Modern displays anticipate variations in individual visual capability and degradations in display performance over time by providing controls for adjusting, among other things, the overall luminance level of the display (brightness) and the range of luminance between bright and dark information (contrast). Adjustment to the brightness control causes a change in luminance in all areas of the display. Brightness is adjusted to ensure that all information in the image, from black (zero luminance) to white (maximum luminance), is visible under the prevailing viewing conditions. Accordingly, the optimum setting of brightness is totally dependent upon the adaptive state of the eye and the ambient viewing conditions. Contrast is adjusted to change the luminance in all "non-black" areas. This change in luminance is proportional to the relative luminance level between white and black of the displayed information. For example, the change in luminance for mid-level gray information may be half that experienced for white information. While it is possible to establish fixed performance ranges for these controls and others, the optimum settings for these controls will vary over time, from person to person, and under the various viewing conditions.

Brightness and contrast are interactive settings which directly affect the display quality. Assuming the dynamic range of a display in terms of light intensity covers a range from 0 (black) to 300 (maximum luminance) in arbitrary units, and that when light intensity is over 255, resolution is compromised, it is desirable to adjust brightness and contrast to provide an operational range from 0 to 255. The threshold of black (the precise point at which light intensity is not discernible) is variable, however, depending upon the condition of the display device, its age, and the inherent performance capability and adaptive state of the viewer's eye. Therefore, the brightness control, used to set the black threshold point, has a range of, for example, −25 to +25, and is ideally zero. Anything less than zero is considered "blacker than black," and is presumed to be not discernible. Once brightness is set, the contrast control is adjusted to provide a maximum light intensity in "white" areas of 255.

It is generally accepted that display of monochrome information (black and white) is the most difficult task of the display. Accordingly, a test that assesses the display's ability to present monochrome information is valuable to verify performance of the display to an acceptable level, not necessarily to provide quantitative data on what that performance is. Moreover, if the black threshold and white maximum of a display are properly set, the accuracy of the information between these limits can safely be assumed. The entire gray scale need not be analyzed, except for periodic quality assurance or for display certification. A simple test of the threshold value for the black and white extremes upon which adjustment of brightness and contrast can be made for present viewing conditions is all that is necessary. Using such a test, the brightness and contrast adjustments may be balanced to discern fine detail over the entire range of light emission from the display.

Since the invention of video displays for entertainment television with analog technology, it is presumed that there is no significant limitation in developing any level of luminance between the black and white extremes. Correspondingly, there has been little interest in the question as long as one can achieve a "pleasing" image. There has been attention to the characteristic of luminance difference obtained for a change in input signal amplitude. The characteristic of the eye is non-linear, phosphor response is non-linear, and light sensitive camera pickup devices are non-linear. There are various electronic manipulations to compensate for these characteristics, generally referred to as "gamma correction." The goal is to provide a "linear" characteristic, electronically, for the video signal transmitting information to a display device. This has led to the acceptance of the "linear" gray scale signal whose waveform resembles a staircase as shown in FIG. 5. Traditionally the number of levels (often referred to as "steps") has been ten, including black, white and eight intermediate "gray" luminance levels. Note that even in color systems the black to white gray scale remains the descriptor of luminance characteristics. This type of gray scale has been provided on television test charts and in various pattern generators since the birth of television. Representative is the EIA Resolution Chart, 1956, a widely used industry standard.

There have been gray scales of various increments proposed and used in various applications such as 16, 32, 64, etc. They have been presented in the familiar staircase configuration. A "ramp" signal, a gradual, linear transition from black level to white level, also has been employed to indicate the characteristic of luminance produced from a video signal input to a display device. Such signals have been developed by analog circuit techniques. However, there has been relatively little attention to the matter, as it has been assumed that the ability to develop various gray levels matches or exceeds the ability of the eye to perceive such small changes in display contrast. The most significant update in technology was brought about by the Medical Imaging Test Pattern developed by a committee of the Society of Motion Picture and Television Engineers (SMPTE), their Standard RP-133. This remains the principal tool for performance evaluation of video displays in medical imaging applications.

As video has become applied to non-entertainment uses, there has become increased interest and concern over the ability to discern information presented with very small variations in luminance, far more than is addressed by the traditional ten level gray scale. There is question especially in the region "near black" that is unaddressed by the traditional gray scale. The issue was addressed in development of the SMPTE pattern, which includes a "near black" patch at 5% above black (in terms of video signal level excursion between black and white being 100%) and a "near white" patch at 95%. These patches became the first known use of shapes that are evaluated by viewability, intended to be used as a reference for proper setting of Brightness (near black) and Contrast (near white). This level of performance test was developed in 1983, prior to the widespread use of digital technology in video.

More demanding applications are arising, notably digital mammography and advanced cardiology diagnostic devices in which performance is expected to be able to present a much finer discernible shape than previously of interest.

Through digital technology we now are able to synthesize images as well as to process video signals to a degree never before possible. However it remains necessary to convert digital signals to an analog representation to present an image for interpretation by the human eye. This is done by the Digital-to-Analog Converter (DAC). However, whereas in traditional video systems it was assumed that there could be the development of changes in luminance in an almost infinite variety, digital systems can provide waveform voltage changes, and therefore variation in luminance output from a display device, in so many discrete steps. An "8-bit" system can product 256 discrete voltage levels over the dynamic range from black to white in a video signal. A "4-bit" system can produce 16 discrete voltage levels, a "10-bit" system 1024 levels, etc. We have come to expect to be able to discern information developed in these increments. However, there is not a means to definitively evaluate such. It is assumed that the traditional presumption of infinite capability between black and white will suffice, but experience is showing that this may not be the case.

Performance of the human eye is so adaptable that it has about defied description. In confining the discussion to the ability to discern small changes in luminance we know that the eye performs in a relative manner, not in a discrete fashion. Therefore it is necessary to be able to condition, or adjust, a display device to make the desired information visible and discernible. A complication is that display devices are prone to vary in luminance production over time, so that adjustment is necessary to compensate for changes in the display device.

In the past it was widely accepted that the eye can detect and identify a "2%" change in luminance. This is largely a meaningless number, for the actual discernability is dependent upon many conditions and is thought to vary from person to person. As digital systems become able to produce very fine but known incremental changes in luminance it is likely that more information is presented than can be discerned. This is of concern to those working with digital mammography technology and cardiologists. The degree to which this could occur is unknown and does not appear to be under formal study. Until now there has been no means to evaluate this characteristic or to check one's ability to be able to discern all that is being presented to an appropriate degree. The "5%" reference squares in the SMPTE pattern are too coarse to be of value.

While there have been representations that a video device can produce useable "8-bit, 10-bit" video, experience teaches that this is questionable. There has not been a means provided to determine what level of performance should be expected and what information can, in fact, be discerned in an existing viewing environment. While this is inconsequential in entertainment viewing and ordinary personal computer use, it is a critical consideration in demanding applications such as medical radiology. If, in fact, the fabled "2%" variation is valid as a threshold for ability to discern information, anything more than a 6 bit digital system (64 discrete luminance levels) is inappropriate for development of images. There is reason to believe that, with proper viewing conditions, the eye can perform better than is widely accepted.

SUMMARY OF THE INVENTION

The present invention provides a display test system for providing continuous assessment of display quality in terms of viewability including a controller for generating a symbol in response to a testing event (e.g., an viewer request), and communicating with the display to produce an area on the display having a first light intensity and to produce the symbol at a second light intensity within the area. In one form of the invention, the viewer is prompted to provide input to the system identifying the symbol to verify the viewability of the difference in light intensity between the area and the symbol. In other embodiments of the invention, a plurality of symbols of varying intensity may be displayed in the area having the first light intensity. The viewer identifies the faintest visible symbol to determine the capability of the display for displaying variations in light intensity. Other variations of the invention include a timer for automatically initiating periodic testing events, and sensors for initiating testing events in response to changes in the viewer's eye adaptation, or changes in ambient viewing conditions.

In accordance with a further aspect, novel means are provided to evaluate the ability to (a) present the most subtle change in contrast that can be achieved and (b) do so in a manner that confirms the ability for such information to be discerned by the human eye. This is a departure from the conventional gray scale and ramp configurations used to date.

The human eye operates in an analog fashion, developing a response to variations in input light energy. Traditional analog electronic display systems provide seamless presentation of luminance from minimum (black level) to maximum (white level). Modern systems develop an image by digital techniques in which the processed information is converted to an analog signal format for transmission to a display device. By the nature of digital systems, changes in luminance must be presented in discrete increments, the number of increments possible being controlled by the "width" of the digital system. For instance, a system that is one bit wide can provide only two states, presumably black and white (or "on" and "off"). A "four bit" system can provide 16 increments in brightness that can be presented from "black" to "white", an "8 bit" system can provide 256 increments, a "10 bit" system 1024 increments, etc. In one sense, this is a disadvantage of a digital versus analog process. However it provides the opportunity to be able to control precisely increments of luminance produced on an electronic display. The premise of this invention is that in the digital development or processing of a video signal, luminance can be developed predictably at any increment desired and presented in a form most suitable for discernment by the human eye. This is especially significant in presenting an image that is representative of information as it might be presented in a digitally processed x-ray image. Studies in vision especially conducted for interpretation of x-ray images indicate that a subtle change in contrast must occur in isolation, not in an adjacent form as presented in the display of a gray scale or ramp signal, to accurately portray ability to discern subtle variations in luminance. Designed reference images are created to present information in this manner. One manner is to present recognizable shapes or symbols in various sizes and at subtle luminance level differences which the operator must correctly perceive (and possibly confirm doing so before being allowed to proceed in image interpretation). These reference images may be presented in such fine increments of luminance as are specified for the application, e.g. $\frac{1}{16}$ luminance difference for a 4-bit system, $\frac{1}{256}$ luminance difference for an 8-bit system, $\frac{1}{1024}$ luminance difference for a 10-bit system, etc. A difference in luminance, as between a symbol and its surrounding background, is termed Contrast. For purposes of this invention, the Contrast Increment is defined as the minimum change in luminance possible over the total luminance range (from black to white) attainable, e.g. $\frac{1}{256}$ for an 8-bit digital system. Reference images may be presented as programmed to a specific number of Contrast Increments, thereby providing predictable contrast. Difference is defined as the fraction of total luminance range attainable from black to white. Presentation of reference images in this format is intended to provide confirmation that display performance is "good enough" for the intended application.

Another form is to present in a pattern a number of reference luminance levels in a predictable form and location so that the viewer can assess "how good is it." Such patterns contain incremental blocks of luminance presented at "one Contrast Increment ($\frac{1}{256}$)", "two Contrast Increments ($\frac{2}{256}$)", "three Contrast Elements ($\frac{3}{256}$)", etc., over or under the reference background, which may be at white, black or any intermediate gray shade or color desired. The viewer must ascertain that he or she can or cannot perceive all reference blocks, and if not, which ones to determine display quality.

Presentation of such fine luminance changes in discrete Contrast Elements has not been done previously. It provides a very powerful tool to not only describe display performance, but equally or more important, to also assess the ability to discern subtle changes in luminance. Thus if display quality is lacking, if the viewing environment causes inappropriate eye adaptation, or if visual capability is lacking, it will be revealed. This is a most significant elevation of capability in assessment of display quality and content for virtually any application.

Although currently available digital pattern generators are capable of outputting signals that will cause light intensity changes in known Contrast Increments, such equipment has not actually been implemented to provide outputs that are one Contrast Increment apart. For example, although a digital pattern generator may be capable of outputting 256 individual levels of luminance (eight bit system), what has been done in practice is to output, e.g., ten different levels of a traditional gray scale by selecting ten levels within the 256 levels available. In accordance with the present invention, luminance levels that are one Contrast Increment apart, e.g., $1/256$, $2/256$, $3/256$ presented on a black background, $126/256$, $127/256$, $129/256$, $130/256$ presented on a mid-gray (128) background, and $254/256$, $255/256$ presented on a white (256) background over or under the reference background are outputted.

The present invention, in one form thereof, provides a novel technique and supporting technology to provide a definitive means to evaluate image quality and ongoing performance at minute contrast variations. The key is to develop recognizable shapes at the finest possible increments that are expected to be discernible in Specific Contrast Increments in a digital system. For example, in an "8-bit" system there is the ability to produce symbols with luminance variation of $1/256$ of the range between black and white =0.0039 of the luminance range from black to white. The key to successful and expedient display evaluation is to present these recognizable symbols (e.g., numbers, letters, squares, triangles, etc.) in relative isolation rather than bundled together as in a ramp or gray scale presentation. The intent is not to present information to be analyzed by photometric or electronic waveform means but to confirm that (a) the information is being properly presented, and (b) the viewer is able to discern this information. If not, the display device may require readjustment, the viewing environment must be changed, or there may be the need to redefine minimal variations in luminance that are expected to be discernible.

Another consideration is that a great variety of test patterns and charts have been in common use, but interpretation requires some skill on the part of the observer and image suitability is a matter of subjective interpretation—which also can be conditioned by eye adaptation and the viewing environment. Presenting a recognizable symbol in isolation offers the opportunity to require the viewer to identify or describe the symbol as confirmed by entry via keyboard into the system in use. Also the symbol can be varied at random. Therefore viewer conditioning and subjectivity is removed from the equation—there is absolute confirmation of information being discernible.

BRIEF DESCRIPTION OF THE DRAWINGS

These and other features of the invention will become more apparent and the present invention will be better understood upon consideration of the following description and the accompanying drawings wherein:

FIG. 4 is a conceptual diagram of an operating environment of a display.

FIG. 5 is a diagrammatic representation of a prior art gray scale signal.

FIG. 6 is a diagrammatic representation of one embodiment of the system for implementing the present invention.

FIG. 7 is a diagrammatic representation of the further embodiment of the system for implementing the present invention.

FIG. 8 is the Verify display pattern resulting from implementation of the display testing system and method according to one form of the present invention.

FIG. 9 is the Evaluate display pattern resulting from implementation of the display testing system and method according to one form of the present invention.

DETAILED DESCRIPTION OF THE EMBODIMENTS OF THE INVENTION

The embodiments of the invention described herein are not intended to be exhaustive or to limit the invention to the precise forms disclosed. Rather, the embodiments selected for description have been chosen to enable one skilled in the art to practice the invention.

Figure 1:
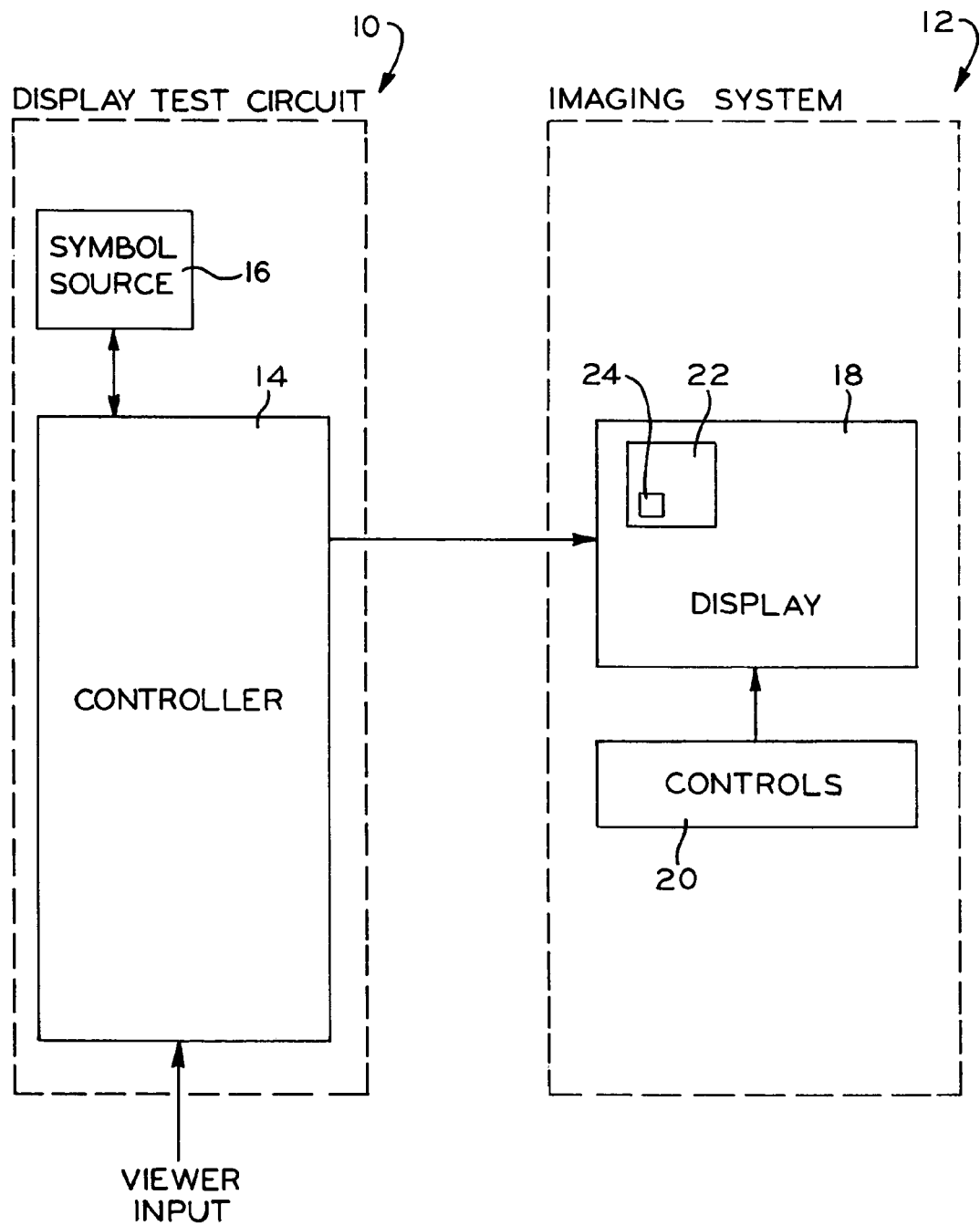
FIG. 1 is a block diagram of a display test circuit according to one embodiment of the present invention.

Referring now to FIG. 1, a display test system 10 according to one form of the invention is shown connected to an imaging system 12. System 10 generally includes a controller 14 and a symbol source 16. It should be understood that system 10 may be implemented in either hardware or software. More specifically, it is clearly within the ability of one of ordinary skill in the art to implement the functions and features of system 10 using well known hardware or software technologies. Imaging system 12 includes a display 18 and display controls 20.

In accordance with one embodiment of the invention, suitable hardware and software for implementing the test system and method of the present application is a commercially available Model 890 video reference image generator available from Video Instruments of Xenia, Ohio. This is illustrated diagrammatically in FIG. 6 where it will be seen that the image generator 13 receives data input from a personal computer 15 via a serial port to a standard RJ45 connector whereby images are downloaded from the personal computer and stored in the image generator. Computer 15 may have conventional inputs, such as keyboard 15a and mouse 15b. The images in the form of a large number of available test patterns are outputted to the display 18 being tested. The image generator develops precision reference images (test patterns) for test and performance evaluation of the display under test. The generator can store up to 16 video reference images for instant recall, and the reference images are assembled on personal computer utilizing pattern generation software also available from Video Instruments and loaded into the personal computer by way of a standard floppy disk. As discussed previously, the image generator provides pattern outputs with intensity levels that are digitally generated, and although the pattern generator system from Video Instruments is preferred, digital pattern generators are available from other sources and can also be utilized to implement the display testing method of the present invention. As will be described in greater detail below, the basic operation of system 10 is triggered by a testing event. One such testing event may be a test request inputted by the viewer to controller 14. According to one embodiment of the invention, controller 14 responds to a testing event by causing display 18 to display an area 22 having a first light intensity. Area 22 could be any reasonable size, or include the entire display 18. Next, controller 14 receives a symbol 24 from symbol source 16, and causes display 18 to display the symbol 24 within area 22. As further described below, the symbol 24 is a recognizable shape or character having a second light intensity which is near the first light intensity associated with area 22.

It should be understood that symbol source 16 may simply be a memory device or location within controller 14 for storing data corresponding to a plurality of readily identifiable symbols. Symbols, as used herein, refers to any shape or character, or combination or series thereof. Readily identifiable symbols may include numbers, letters, geometric shapes, or images such as a star, a cross, a flag, etc. It should be further understood that symbol source 16 may also be a random symbol generator which randomly generates data corresponding to readily recognizable symbols and provides that data to controller 14 in response to a testing event.

Alternatively, the display test system hardware could comprise computer 15 functioning as a controller, symbol source, etc., connected directly to display 18 wherein the computer 15 is programmed to generate the appropriate display signals in a manner to be described below.

Additionally, while this description presents the invention in terms of testing variations of gray, the principles disclosed herein are equally applicable for testing variations of color. In general, to determine whether display 18 is capable of adequately displaying subtle variations of gray, controller 14 assigns to symbol 24 a light intensity which differs from the light intensity of area 22 by an amount just greater than the required minimum change for the necessary display performance. The viewer is then prompted to identify symbol 24. The viewer may also be prompted to identify the location of symbol 24 within area 22 (e.g., upper left-hand corner). Of course, this approach assumes that the desired display performance is known. It further assumes that the discrete video levels between black and white required by the desired system performance are sufficiently separated so as to be discernible by the human eye. Where these criteria are met, the above-described test confirms that performance is adequate for the task at hand.

The underlying premise is presentation of information, such as numbers, which are constructed at specific Contrast Increments. The guiding principal for this is that video images derived by digital means can develop only so many levels of brightness in the range of from black to white, for example:

| Power of 2 | Digital System "Width" | Contrast Increments Available | Luminance levels Possible |
|---|---|---|---|
| 0 | 0 (bits) | 1 | Indeterminate |
| 1 | 1 | 2 | Black and white |
| 2 | 2 | 4 | Black, 2 gray levels, white |
| 3 | 3 | 8 | Black, 6 gray levels, white |
| 4 | 4 | 16 | Black, 14 gray levels, white |
| 5 | 5 | 32 | Black, 30 gray levels, white |
| 6 | 6 | 64 | Black, 62 gray levels, white |
| 7 | 7 | 128 | Black, 126 gray levels, white |
| 8 | 8 | 256 | Black, 254 gray levels, white |
| 9 | 9 | 512 | Black, 510 gray levels, white |
| 10 | 10 | 1024 | Black, 1022 gray levels, white |

Note that this is presented for each channel of a video system. A monochrome system, as is used in radiology, operates from a single video channel whereas an RGB color system has three parallel video channels (Red, Green and Blue primaries) and sometimes is termed, for instance, "24 bit" (three channels, each providing 8 bit capability). Color is considered a secondary level consideration, as it is a subjective quality. However the ability to discern very low contrast information, monochrome or color, is a primary consideration. Presenting monochrome information is the more demanding task, for in a color system true monochromatic information is the correct combination of red, green and blue stimuli.

The more straightforward application of this technique is to present a series of cues in a known shape at 1-bit increments. This has information at the following levels (based upon an 8 bit system which can develop 256 discrete video levels);

Black and near black=0 (background), 1, 2, 3, 4, 5, 6, 7, 8

Mid gray=128 (background) 124, 125, 126, 127, 129, 130, 131, 132

White and near white=255 (background) 254, 253, 252, 251, 250, 249, 248, 247 This combination assures ability to discern all possible information presented by an 8 bit system.

However there is the question of psychological conditioning and absolute visual discrimination. It may be possible to "see" an element that is not adequately presented. Also ability to discern a visual image is dependent upon surrounding illumination and the adaptive state of the eye. A more demanding test would be to present a shape that must be identified—as in a series of numbers. If the numbers are discernible, image quality is satisfactory for the task at hand. Assuming that the image is being viewed on the display of a computerized system, the user could be required to type in the number discerned to verify their ability to detect information in the image. If the correct number as displayed is not typed in, an error message is shown and the user cannot proceed with a task until a displayed number is correctly discerned and verified by keyboard entry. This type of use presumes that system capability is known and the test is to confirm that performance is adequate for the task at hand. For instance an 8-bit system may be required to present only 64 levels for satisfactory performance, so there is no benefit from presenting information in finer gradients than that; presentation of black, a check number at level 63, a check number at level 191 and white would confirm adequate system performance. This responds to the question, "Is it good enough?"

If the question is "How good is it?" one can develop a string of numbers, e.g. 0 though 255, and the user would determine which of these is discernible. The numbers could be created very fine, based upon 1 pixel element structure, or could be more coarse if the intent is to evaluate low contrast capability only. Presentation of both would indicate the limitation in development of fine detail that may be present. For instance, level 35 may be the lowest discernible in a small number but level 22 would be discernible with a coarse number. It would be possible to develop a figure of merit or other type of analytical description of performance from such a series of test stimuli.

The presentation of symbology in isolation at such fine, known increments in luminance change is unprecedented. It is, at present, unknown that the eye can or cannot perceive such fine gradients in luminance variation. Also such fine luminance as "one Contrast Increment" may not be essential for all applications. Therefore implementation of this technique provides for the user to establish the acceptable minimum in luminance variation, which may be represented by several Contrast Increments (e.g., acceptable performance may be attained by nine Contrast Increments which represents 9/256 of the range from black to white=3.5% of the luminance range from black to white).

In recognition of this, the technique offers the means to initially establish acceptable minimum discernible luminance variation (referred to as contrast change). This is accomplished by presenting a series of separated identifiable shapes, such as a string of numbers, in which each digit is presented at a different luminance gradient. For example, the number string of 1 2 3 4 5 6 7 8 9 (see FIG. 9) can represent increasing steps of luminance variation in one Contrast Increment steps, each increment representing 1/256 of the range from black to white. If the numbers 1 2 3 4 are not discernible, it is evident that the viewer is unable to discern no finer than 5/256=1.95% of the luminance range from black to white.

Figure 2:
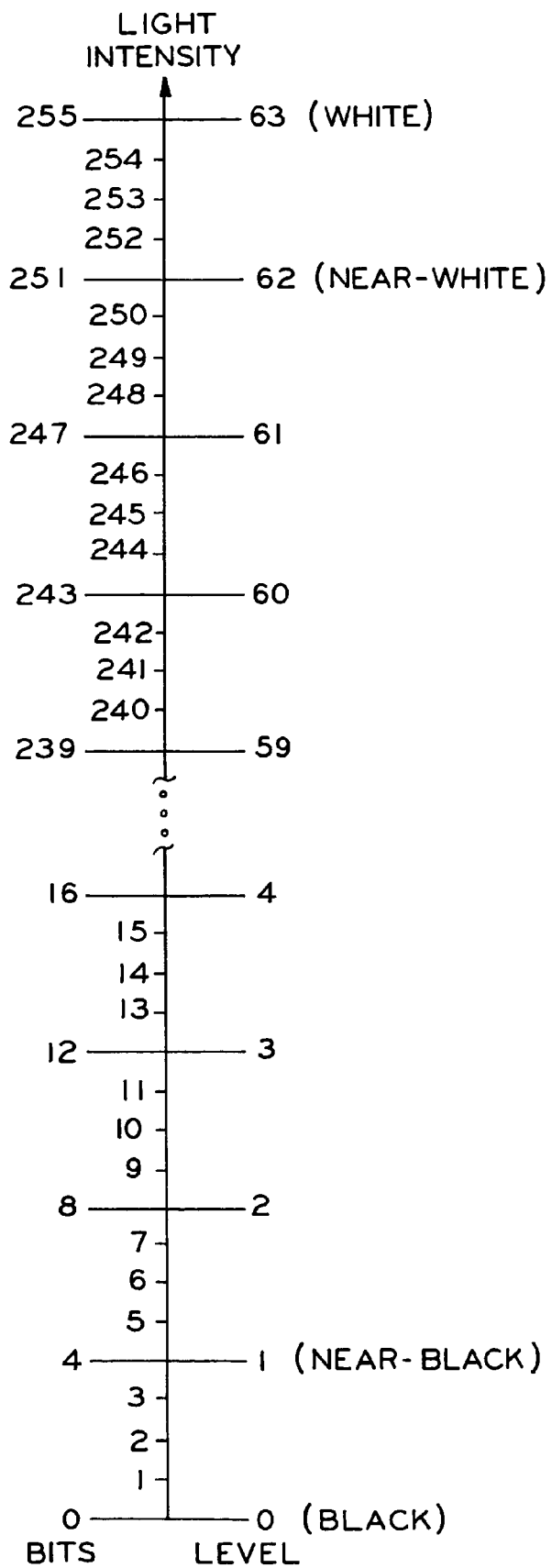
FIG. 2 is a graph of light intensity levels.

Referring now to FIG. 2, a hypothetical eight bit system is capable of displaying light intensities between black and white in 256 increments. In the hypothetical system shown in FIG. 2, the most demanding representation of detail in an anticipated image requires only 64 different levels of intensity between black and white. Each level corresponds to a four bit increment. Accordingly, in one embodiment of the present invention, controller 14 can cause display 18 to display area 22 at level 0 (black) and symbol 24 on area 22 at level 1 (near black). The viewer is next instructed to adjust the brightness and contrast controls 20 of display 18 until symbol 24 is visible, and provide input to controller 14 identifying symbol 24 (such as by typing a description or repeating the character or characters included in symbol 24 through an input device such as a keyboard to controller 14). Because the light intensities of area 22 and symbol 24 are very close to the same, adjustment of controls 20 until the difference in intensity between area 22 and symbol 24 is discernable provides information that display 18 is functioning at a level adequate to display the anticipated level of detail required by system 12. If the viewer is unable to discern or identify symbol 24 regardless of the settings of controls 20, the viewer will be unable to verify the performance of the display by inputting information relating to symbol 24 to controller 14. In one embodiment of the invention, controller 14 may be programmed such that failure to properly identify symbol 24 results in a suspension of operation of display 18 to ensure that images displayed on display 18 will not be misinterpreted because of a change in performance of the display or some other variable.

Assuming a near black symbol 24 displayed on a black area 22 is properly identified by the viewer, controller 14 may cause display 18 to display area 22 with a light intensity of level 63 (white). Symbol 24 is then displayed on area 22 with a light intensity of level 62 (near white). Again, if the viewer is able to discern a difference between the intensity levels by identifying symbol 24 and providing the correct identification data to controller 14, then adequate performance of display 18 at the other end of the spectrum will be verified.

It should be understood that multiple testing events at light intensities other than those described above (i.e., between various adjacent levels located anywhere within the light intensity spectrum) may be added and executed in the manner described above. In applications such as radiology, subtle changes at various brightness levels between the ends of the spectrum must be reliably discernable. While it is generally understood that it is safe to assume display performance between the ends of the spectrum is adequate if adequate performance at the ends of the spectrum is verified, multiple low contrast tests between various intermediate gray levels will provide further assurance of adequate display performance. Such additional assurance may be particularly desirable for critical applications such as digital mammography.

System 10 may further test the resolution of display 18 by varying the widths of symbols 24. For example, symbols 24 may have a very fine, single pixel element structure to ensure that very fine detail is visible on display 18. If relatively low levels of detail are required by system 12, symbols 24 may have a more coarse element structure. Of course, both low contrast and resolution may be tested simultaneously by providing symbols 24 with light intensity very near the intensity of area 22 and fine element structure.

In a system 12 having a display 18 with unknown performance requirements, testing system 10 of FIG. 1 may be used to determine the present capability of display 18. Specifically, controller 14 may receive a plurality of symbols 24 from symbol source 16 for display on area 22. In one example, if eight symbols 24 were used, area 22 may be generated with a light intensity of 0 (black), while symbols 24 are displayed on area 22 at intensities corresponding to one through eight bits, respectively. The viewer is instructed to identify the faintest visible symbol 24 by providing input to controller 14 identifying that symbol 24. If, for example, the viewer is able to identify only the 8th and 7th symbols, then the viewer would input data to controller 14 identifying the 7th symbol (the faintest symbol visible). Based on this data, system 10 determines that the combination of the display performance and the viewer's viewing capabilities as affected by physical characteristics and ambient viewing conditions, corresponds to increments of gray between black and white of 7 over 256 bits (i.e., increments of 2.73%). Data may be similarly obtained at the other end of the spectrum or anywhere within the light intensity spectrum to further increase the accuracy of the performance characterization provided by system 10. By evaluating the performance of imaging system 12 in this manner, system 10 permits periodic characterization of system performance which may be used as a reference for the day-to-day checks of system performance as first described above. In other words, once a gradient increment of 2.73% is determined acceptable for the application of display 18 (at a certification test), future testing events may involve displaying only symbols 24 which are 7 bits different from the light intensity of area 22. If the viewer is able to identify such symbols in the manner described above, controller 14 determines that the system performance relative to the certification test has been maintained.

Figure 3:
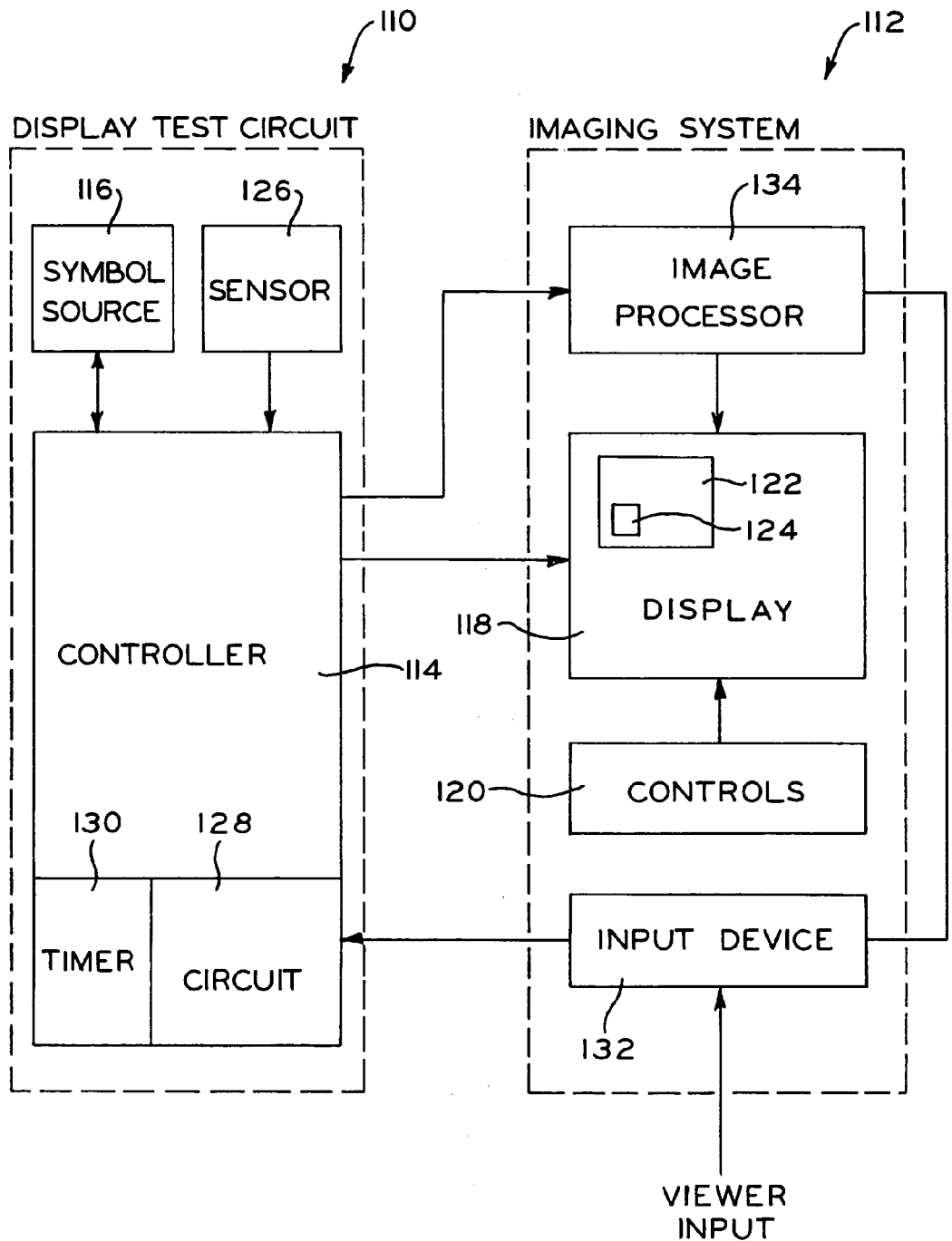
FIG. 3 is a block diagram similar to FIG. 1 of another embodiment of the invention.
Figure 10:
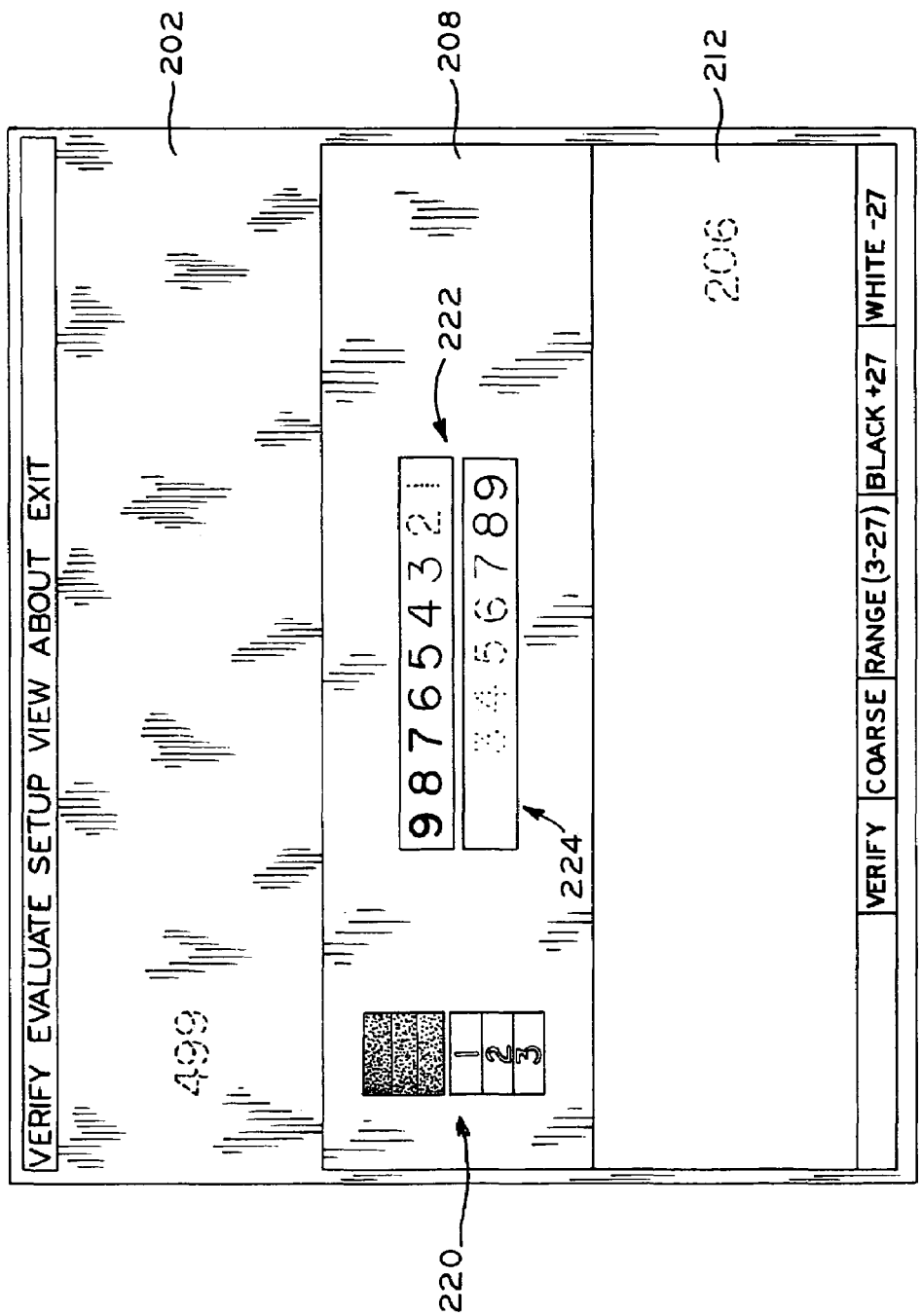
FIG. 10 is the Setup display pattern resulting from implementation of the display testing system and method according to one form of the present invention.
Figure 11:
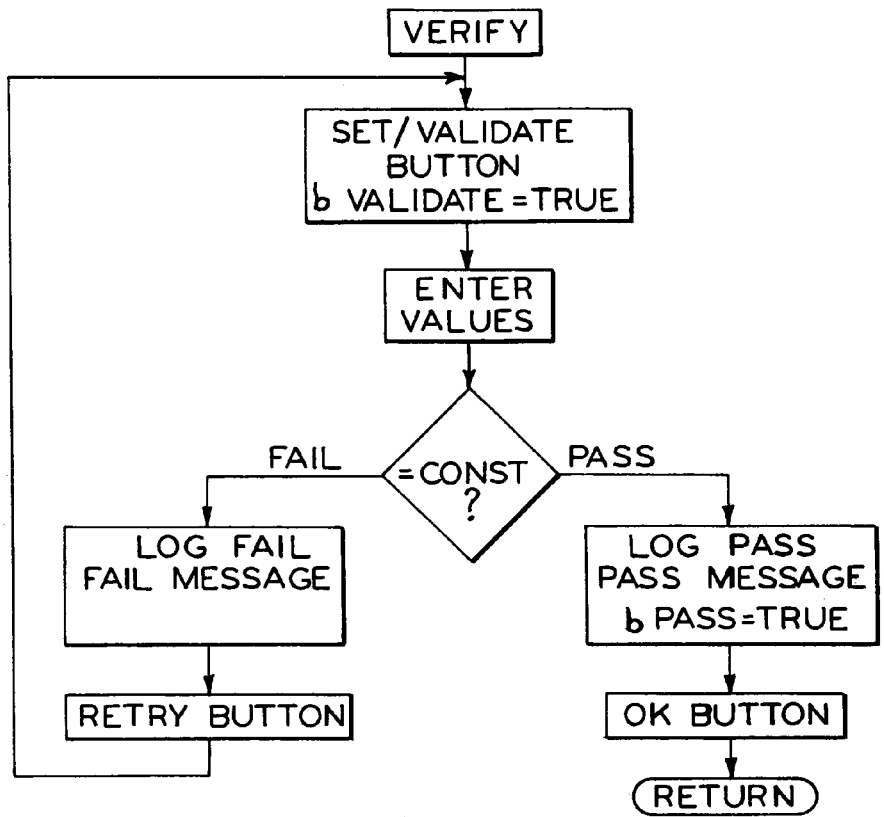
FIGS. 11–15 are flow charts for the display testing system and method according to one form of the present invention.
Figure 12:
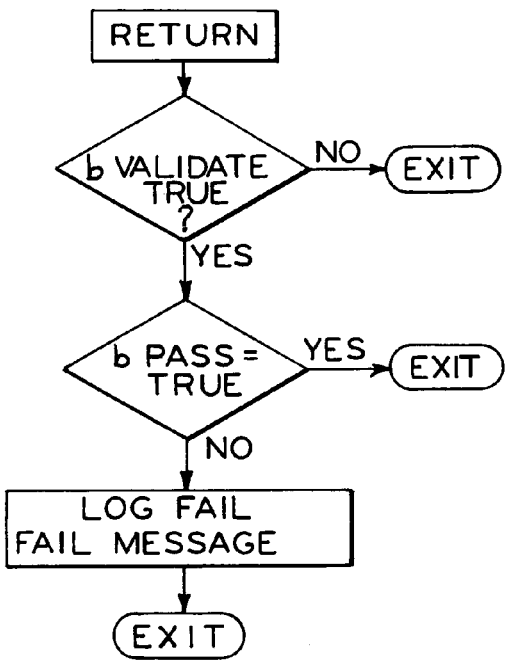
Figures 13, 14, 15:
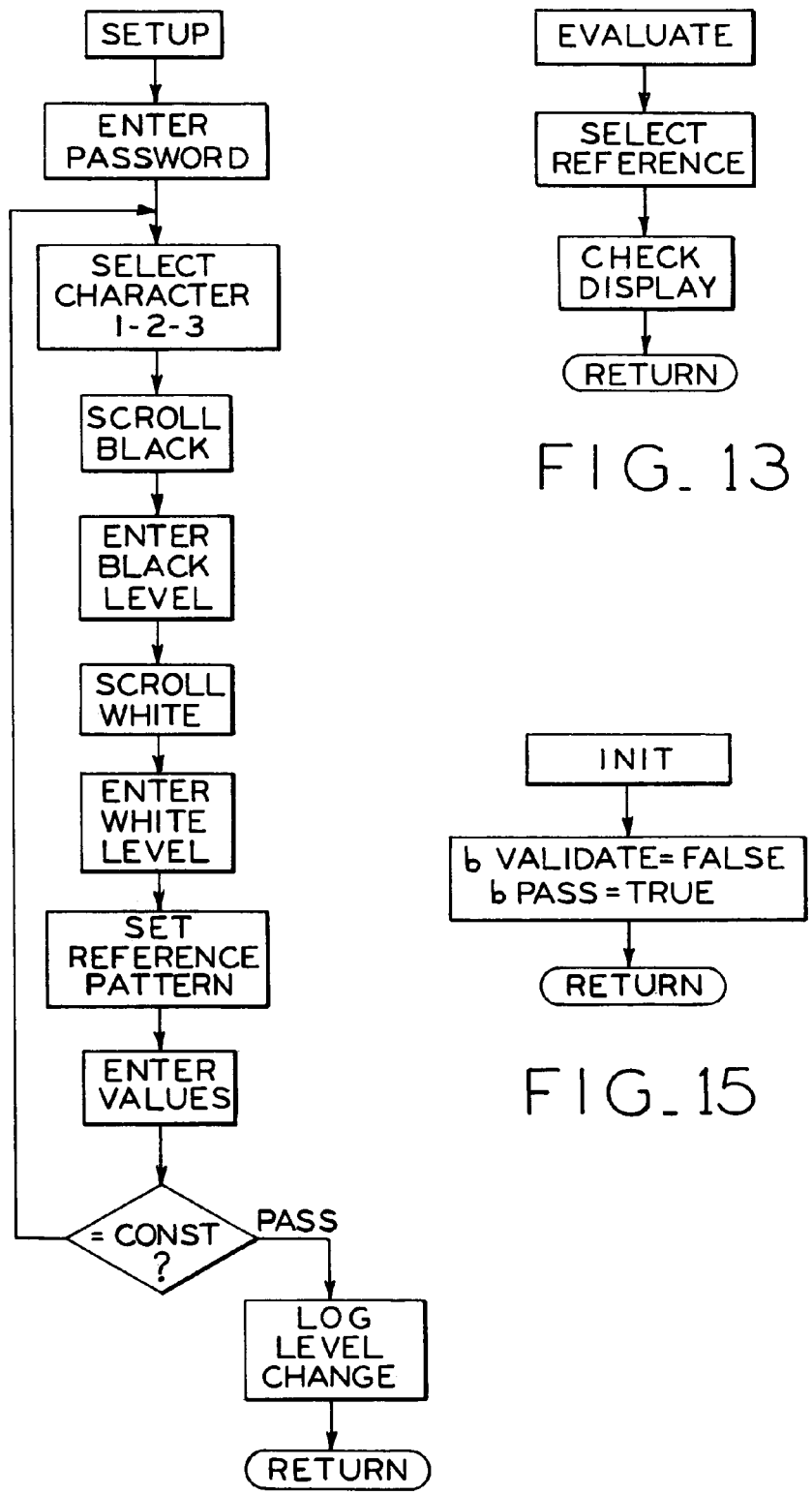

FIG. 3 shows an alternate embodiment of a display test circuit according to the present invention. System 110 includes a controller 114, a symbol source 116, and a sensor 126. Controller 114 includes an input circuit 128 and a timer 130. Imaging system 112 is similar to imaging system 12 and includes a display 118, controls 120, an input device 132, and an image processor 134. Imaging system 112 could be any of a variety of conventional imaging systems, all of which at least include display 118 having controls for the various display adjustments including brightness and contrast, and an image processor of some sort to obtain or generate an image for display on display 118. It should be understood that input device 132 need not be part of imaging system 112, but would be typical in a computer based system. Instead, input device 132 could be part of system 110.

The basic function of system 110 is the same as system 10 described above. System 110 as shown in FIG. 3, however, depicts an input circuit 128 as part of controller 114 for receiving viewer input through input device 132 of imaging system 112. Heretofore, viewer input has been described simply as received by controller 14. It should be understood that input device 132 could be a keyboard, keypad, a voice recognition device, or any other such device for converting viewer input to a form which is acceptable for input circuit 128.

Controller 114 further includes timer 130. Timer 130 may be programmed such that it periodically provides a signal to controller 114 to generate a testing event. Of course, according to principles well known in the art, such signal could be provided at substantially regular intervals, at random, or at any other interval. Accordingly, timer 130 may provide a mechanism for ensuring that relatively periodic performance checks are made of display 118.

System 110 further includes sensor 126 which also may be used to generate testing events. Referring to FIG. 4, imaging system 112 may be located in a special viewing room 136 which provides controlled lighting for optimum viewing. However, if the viewer 138 leaves room 136 through door 140, the adaptive state of the eyes of viewer 138 may change due to different ambient lighting conditions outside room 136. If viewer 138 then returns to room 136 and immediately begins viewing images on imaging system 112, details of those images may be indiscernible to viewer 138 because of the changed adaptive state of the eyes of viewer 138.

To prevent misinterpretation of images under such circumstances, the present invention provides sensor 126 which may be a motion sensor, an electromagnetic sensor, a mechanical sensor, a photosensor, or any other type of sensor which is capable of sending a signal to controller 114 of system 110 whenever door 140 is opened. System 110 interprets this signal as a request to generate a testing event. In this embodiment of the invention, first area 122 having a first light intensity and a symbol or symbols 124 having a second light intensity are displayed on display 118. Controller 114 also sends a signal to image processor 134 to disable further operation of display 118 until the display test is complete. Viewer 138 must then identify symbol 124 by providing a description of symbol 124 using input device 132. Input circuit 128 receives this description of symbol 124, and controller 114 compares the description to the data representing symbol 124 generated on display 118. If viewer 138 properly identifies symbol 124, controller 114 provides a signal to image processor 134 to resume operation of display 118.

It should be understood that sensor 126 may be positioned near any area of room 136 having different ambient lighting to detect movement of viewer 138 into that portion of the room. Thereafter, viewer 138 will be required to verify proper viewing of the slight changes in intensity between area 122 and symbol 124. It should be further understood that sensor 126 may trigger a testing event as described above, but timer 130 may also be set to require a waiting period of a predetermined duration before controller 114 will accept viewer input regarding symbol 124. In this manner, viewer 138 will be required to remain in close proximity to imaging system 112 for a predetermined period of time to permit the eyes of viewer 138 to adapt to the viewing conditions. Only after this predetermined period of time has elapsed may viewer 138 provide input to controller 114 to complete the testing sequence described above.

Alternatively, sensor 126 may be positioned adjacent imaging system 112 to detect variations in the ambient lighting conditions adjacent imaging system 112. For example, if the ambient lighting deviates from a reference value by more than a predetermined amount (e.g., a visitor turns on an additional light fixture), sensor 126 detects this change in intensity and sends a signal to display test system 110 to trigger a testing event as described above. As should be apparent from the foregoing, the justification for requiring testing events following changes in ambient lighting is substantially the same as the justification for requiring testing events after viewer 138 moves from one position having a first ambient lighting condition to another position having a second ambient lighting condition.

Once performance limits are established, the user may establish a fixed reference image that is stored for immediate recall in subsequent performance evaluation—to determine if "it continues to be good enough". If it is not, the display device may require adjustment, the viewing environment must be changed, or there may be the need to redefine minimal variations in luminance that are expected to be discernible in which case the Reference pattern would be reconstructed.

Having established the means to define acceptable performance and to effectively check for it, the technique may be extended to automatically log results. The personal computer disk can compile pass and fail events by time and date. The system can be configured so that if a failure occurs on successive attempts, the operator cannot continue until the System Administrator attends to corrections necessary to achieve a "pass" test result. Therefore the technique provides:

- The means to have a check of display quality and discernability quickly, accurately and conveniently whenever desired.
- The means to superimpose the technique on diagnostic images in full time, assuring best possible interpretation at all time.
- The means to maintain a log of testing, both pass and fail, to serve as the foundation of effective quality control and as the basis of display quality certification.
- An affordable, non-invasive method to evaluate performance of the entire image interpretation system, including the viewer. The test images are developed in software that can be installed on any computer system.

FIGS. 7–15 illustrate a further embodiment of the present invention wherein the display testing system and method are implemented completely in a standard personal computer operating on Windows '95, Windows '98 or Windows NT wherein computer 15 is connected directly to display 18 as illustrated in FIG. 7 without the intervening test pattern generator device 13 as was the case in the embodiment of FIG. 6. In the arrangement of FIG. 7, computer 15 itself becomes the pattern generator driven by the software installed therein. FIGS. 11–15 are the flow charts representing the software implementation of the invention utilizing the hardware shown in FIG. 7. The software itself is contained in the Computer Program Listing Appendix forming a part of the application. Said appendix and the program contained therein is expressly incorporated by reference and is contained on a separate compact disc filed herewith.

The system and method described hereinafter is an 8 bit (256 contrast increments) system although other levels of gradation are possible, such as 7 bit, 9 bit and 10 bit systems. Furthermore, although numeric strings are portrayed in the exemplary system, often numeric character strings or strings of symbols that are matched on a standard keyboard or accessed on a screen glossary could be substituted therefor.

Upon opening the program the initial display will be the Verify pattern (FIG. 8). The program contains several operations:

Verify (FIG. 8) is used to confirm display quality is operating to the expected level. It also serves as a reference for proper adjustment of display device Contrast and Brightness.

Evaluate (FIG. 9) is used to obtain an indication of best possible performance.

Setup (FIG. 10) is used to establish threshold contrast to be used in the Verify routine.

About contains a Help file that explains operations and information on how to contact the vendor, Video Instruments.

Exit is used to leave the program.

To select a routine, click on the desired operation in the top menu bar.

The system presents symbols at various intensity levels. These symbols must be discernible if image quality is adequate and the viewing environment is not limiting visual perception. The user will select the Verify pattern for routine check of the ability to discern adequate information, and also may be used as a precision reference to adjust Brightness and Contrast of the display device. The Verify pattern is calibrated for the application by use of the Setup routine. The Evaluate routine is used to obtain an overview of the ability to discern information, including display device performance and assessment of viewing conditions.

Image quality assurance is conducted with the Verify pattern 200 (FIG. 8) that provides a routine check of one's ability to discern information presented on a "soft copy" display. It may be the only pattern used in normal day-to-day quality assurance operations.

The pattern is composed of three major sections, containing the following elements:
- A. In the "black" reference area 202 at the top third of the image, a randomly generated three digit number 204, string of alphanumeric characters, etc., that is set at the minimum "above black" acceptable threshold contrast for the application.
- B. In the center gray area 208, a series 210 of characters or numbers from 9 to 1 that are darker than the background, representing the digital bit increments in contrast below mid-gray level and a series of numbers from 1 to 9 that are lighter than the background, representing the digital bit increments in contrast above mid-gray level. These are provided for reference only and are not involved in the quality assurance validation process.
- C. In a "white" reference area 212 at the bottom third of the image, a randomly generated three digit number 214, string of alphanumeric characters, etc., that is set at the minimum "below white" acceptable threshold contrast for the application.

The system software has the ability to present these reference numbers at such low contrast as one Contrast Increment ($1/256$ of the dynamic range from black to white). Video displays and systems generally do not provide such fine incremental capability. Therefore the user is provided with the means to calibrate the threshold contrast for the reference numbers at the desired contrast "above" black and "below" white to establish thresholds appropriate for any specific application through the Setup routine.

The Verify pattern typically would be supplied from the factory at mid-range. Contrast range is at 2–18 increments and Resolution is with character elements of 2 pixel width. Contrast threshold is at 10 increments ($10/256$) above true black level and 10 increments ($10/256$) below maximum white level: Characters are constructed with elements that are 2 pixels wide. The user may wish to establish other thresholds for their application by using the Setup routine.

Display Setup

Display Brightness and Contrast must be set properly to permit discernment of information at all luminance levels, especially "near black" and "near white." Select Verify. Adjust display Brightness as required to discern the three digit number 240 presented in the black area 202. Adjust display Contrast as required to discern the three digit number 214 presented in the white area 212 without loss of ability to discern the number in the black area 202. Make adjustments to Brightness, Contrast and, if appropriate, the viewing environment by reducing ambient illumination, blocking glare from windows, etc. as necessary to meet performance objectives. If adjustment cannot make these numbers discernible, maintenance or other corrective action is required. Click on OK to exit the Verify routine.

Image Quality Verification

Verify is used to determine that image quality and viewability are sufficient to fulfill requirements of the application; that is, performance is "good enough." It produces the pattern used for routine check of one's ability to discern information presented in a "soft copy" display. It is the only pattern that must be used in normal day-to-day quality assurance operations. Its principal components are two three digit numbers 204 and 214, one at the upper left corner of the pattern that is brighter than the black background 202 by a; predetermined amount and the other at the lower right corner that is less bright than the white background 212 by a predetermined amount. Verify utilizes the pattern as established through the Setup routine.

Click on Verify to activate the previously established pattern with content expected to be discernible in normal operation of the system. Enter the three digit number that should be discernible at the left side of the black image area. Press TAB to change to the box for entry of the three digit number that should be discernible at the right side of the white image area. Click on the Validate box to perform system verification; a message will show whether the numbers entered were correct or incorrect. If the numbers entered are incorrect, the user may click on Retry to repeat the process after making appropriate adjustments to the display or viewing environment. Click on OK to exit the Verify routine. Note that all of the above operations will be stored in the Log of Operations in the program. The operator cannot exit the program without a failure being logged.

Display Evaluation

Evaluate (FIG. 9) is used to determine what performance is—"How good is it?" as compared to "is it good enough?" as determined by the Verify procedure. To review performance of the display device alone, it is recommended that the surrounding area be darkened so that the viewer can discern information as presented on the display screen. To evaluate the ability to discern information as presented, it is important that viewing conditions are optimum and that system adjustment is correct. Select Evaluate. The pattern 216 (FIG. 9) contains the following elements:
- A. In a "black" reference area 202 at the top third of the image, a series of numbers from 1 to 9 that represent the Contrast Increments "above black" for these numbers.
- B. In the center gray area 208, a series of numbers from 9 to 1 that are darker than the background, representing the Contrast Increments below mid-gray level.
- C. In the center gray area 208, a series of numbers from 1 to 9 that are lighter than the background, representing the Contrast Increments above mid-gray level.

D. In a "white" reference area 212 at the bottom third of the image, a series of numbers from 9 to 1 that represent the Contrast Increments below white for these numbers.

At the left side there is a small, six section box 220 which is used to establish contrast range and resolution in the pattern:

The top three sections permit the user to establish the numerical sequence contrast range, 1–9, 2–18 or 3–27 Contrast Increments. Click on the desired range. Changes will be reflected immediately in the pattern numbers.

The bottom three sections permit the user to establish resolution through the boldness of number font Numbers are constructed at 1, 2 or 3 pixel width elements. Click on the desired font—Fine, Medium or Coarse.

Ranges selected are shown in the status bar at the bottom of the display. Selection of these operating conditions permits the user to establish operating conditions appropriate for the display under evaluation.

Contrast of each number, in terms of increments above or below the area background, is the displayed number multiplied by the current range. For example, if the number five was selected by clicking on "5" in the sequence 222 in gray area 208 and the current contrast range is 2–18 the resultant increment would be 2×5=10:

|        | Contrast Values |      |      |                    |
|--------|-----------------|------|------|--------------------|
|        | Contrast Range  |      |      |                    |
| Number | 1–9             | 2–18 | 3–27 |                    |
| 1      | 1               | 2    | 3    | Contrast Increments |
| 2      | 2               | 4    | 6    | "                  |
| 3      | 3               | 6    | 9    | "                  |
| 4      | 4               | 8    | 12   | "                  |
| 5      | 5               | 10   | 15   | "                  |
| 6      | 6               | 12   | 18   | "                  |
| 7      | 7               | 14   | 21   | "                  |
| 8      | 8               | 16   | 24   | "                  |
| 9      | 9               | 18   | 27   | "                  |

Each digital bit is 1/256 of the range from black to white in an 8-bit system.

For instance, if the range is 2–18 a selection of 5 provides a contrast that is 5×2=10 Contrast Increments ($^{246}/_{256}$) above black or 10 Contrast Increments ($^{10}/_{256}$) below white.

Performance is analyzed by inspection of numbers in each section that are discernable. In an ideal display, correctly adjusted, and with ideal viewing conditions, the full sequence of from 1 to 9 would be visible in all four locations for all control ranges. It is unlikely that all numbers will be discernible in all ranges. However all numbers should be visible in the 3–27 contrast range with Coarse characters. The user is expected to establish what represents suitable operation for their application (e.g. with 2–18 contrast range, Medium character resolution one may be able to see all numbers in the gray section, all but 1 and 2 in the white area, and only 9 to 5 in the black area). This is a, standard of reference for analysis of performance in the future.

Revision of the Verify Pattern

The software has the ability to present reference symbols at such low contrast as one Contrast Increment ($^{1}/_{256}$ of the dynamic range from black to white in an 8-bit digital system). Video displays and systems generally do not provide such fine incremental capability. Therefore the user is provided with the means to preset these reference numbers at the desired contrast "above" black and "below" white to establish thresholds appropriate for any specific application. The thresholds established through the Setup procedure are stored permanently unless overwritten by another Setup operation.

The Verify pattern would typically be supplied from the factory with parameters set for relatively demanding display performance. Resolution is Medium with character elements of 2 pixel width. Contrast range is at 1–9 Contrast Increments and Contrast threshold is at 5 Contrast Increments ($^{5}/_{256}$) above true black level and 5 Contrast Increments ($^{251}/_{256}$) below maximum white level, contrast values that relate to the commonly accepted 2% Just Noticeable Difference (JND) of the human eye. Performance at this level should be achievable in most video displays. The user may wish to establish other thresholds, more or less demanding, for their application.

The display Brightness and Contrast should be properly adjusted and the viewing environment must be consistent with that expected in normal use of the system when setting these threshold values.

Select Setup. This pattern (FIG. 10) is composed of three major areas—black 202 at the top, mid-level gray 208 at the center and white 212 at the bottom.

In the mid-gray center area 208 there are two rows of numbers, the top row 9 to 1 that are darker than the background and the bottom row 1 to 9 that are brighter than the gray background These are used as a guide to establish the contrast of the reference numbers presented at the left side of the black area and at the right side of the white area.

At the left side there are two boxes 220, three sections each which are used to establish contrast range and resolution in the pattern:

The top three sections permit the user to establish the contrast range to be used in performance verification by left clicking on the desired range, 1–9, 2–18 or 3–27 Contrast Increments. Click on the desired range. Changes will be reflected immediately in the pattern numbers.

The bottom three sections permit the user to establish the boldness of number font. Numbers will be constructed at either 1, 2 or 3 pixel wide elements. Click on the desired font—Fine, Medium or Coarse. Changes will be reflected immediately in the pattern numbers.

Using these controls, the user may select the range of contrast and resolution to be used in evaluation of image viewability.

Threshold contrast is determined by the increment selected within the range chosen above. There are two numerical sequences in the gray section, each boxed. Threshold contrast is set in the black region by clicking on the desired numerical increment in the darker numerical sequence. Threshold contrast in the white region is set by clicking on the desired numerical increment in the lighter numerical sequence. Threshold contrast is the selected number multiplied by the current range. For instance if the range is 2–18, a selection of 5 provides a contrast that is 10 Contrast Increments ($^{10}/_{256}$) above black or 10 Contrast Increments ($^{246}/_{256}$) below white:

| | Contrast Values | | | |
|---|---|---|---|---|
| | Contrast Range | | | |
| Number | 1–9 | 2–18 | 3–27 | |
| 1 | 1 | 2 | 3 | Contrast Increments |
| 2 | 2 | 4 | 6 | " |
| 3 | 3 | 6 | 9 | " |
| 4 | 4 | 8 | 12 | " |
| 5 | 5 | 10 | 15 | " |
| 6 | 6 | 12 | 18 | " |
| 7 | 7 | 14 | 21 | " |
| 8 | 8 | 16 | 24 | " |
| 9 | 9 | 18 | 27 | " |

*Each digital bit is 1/256 of the range from black to white in an 8-bit system.

To set the contrast threshold for black and white reference numbers the user performs the following operations:

1. To set the "above black" minimum acceptable contrast, click left on the "least visible" number in the 9 to 1 (darker) row 222 of the gray area. This selection is used to redraw the threshold contrast of the number in the upper left hand corner. Click on various numbers in this row as needed to establish the "above black" threshold condition desired.

2. To set the "below white" minimum acceptable contrast, click left on the "least visible" number in the numbers in the 1 to 9 (brighter) row 224 of the gray area. When the choice is made the selection is used in redrawing the number in the lower right hand corner. Repeat this process to establish the "below white" threshold condition desired All of these parameters are displayed in the status bar at the bottom of the display Once the user has established the desired threshold values in Setup they are stored for future use by selecting the Verify routine. The system password must be entered for authorization to change parameter values in the Verify pattern. Upon entry of a correct password the box will turn green. Upon entry of an incorrect password the box will turn red. If this routine is exited without successful password entry the Verify pattern values will not be changed.

Record of Operations

The Log of Operations shows the date of installation of the system into a personal computer plus initial settings for the pattern and contains a compilation of operations thereafter. Installation date and data remains at the top of the Log at all times. Subsequent operations are listed with the most recent directly under the notation for initial installation. There are entries made whenever the program is accessed, including:

1. The date, time and levels for revision of the Verify pattern.

2. The date and time of successful or unsuccessful use of the Verify pattern.

The Operator cannot exit the program without a failure being logged.

3. The date and time of the user signing off from use of the Verify pattern.

This compilation provides a historical overview that may be printed out for archive of quality assurance operations.

It should be noted that the format for providing information programmed in terms of "Contrast Increments" is not limited to what has been described hereinbefore. For example, information in the form of conventional or newer test patterns, such as the radiological Q.C. pattern available from Video Instruments from Xenia, Ohio, could be programmed and displayed utilizing the techniques described above.

Although the present invention has been shown and described in detail, the same is to be taken by way of example only and not by way of limitation. Numerous changes can be made to the embodiments described above without departing from the scope of the invention. This application is therefore intended to cover any variations, uses, or adaptations of the invention using its general principles. Further, this application is intended to cover such departures from the present disclosure as come within known or customary practice in the art to which this invention pertains.

What is claimed is:

1. A method for testing the performance of a display connected to a controller, the method comprising:
   in the controller selecting a symbol in response to a testing event initiated by a viewer, the identity of the symbol being unknown to the viewer until displayed;
   producing on the display a first area having a background of a first intensity;
   displaying the selected symbol at a second intensity on said first area of the display;
   the viewer, after having correctly identified the displayed symbol, providing input to the controller verifying the identity of the displayed symbol; and
   the controller performing a selected action determining display performance in response to said viewer input to the controller.

2. The method of claim 1 wherein the selected action comprises logging in a memory data representing the correctness of the displayed symbol identification by the viewer.

3. The method of claim 1 wherein the step of selecting the symbol includes randomly selecting the symbol.

4. The method of claim 1 wherein the first intensity is less than the second intensity.

5. The method of claim 1 further including the step of providing a sensor for sensing the intensity of ambient light adjacent the display to generate a testing event whenever the ambient light deviates from a reference value by more than a predetermined amount.

6. The method of claim 1 including the step by the viewer of adjusting at least one of intensity and contrast controls for the display to optimize the visibility of said displayed symbol.

7. The method of claim 1 including the further steps of:
   selecting a second symbol in response to the testing event, the identity of the second symbol unknown to the viewer until displayed;
   producing on the display a second area having a background of a third intensity different from the intensity of the first area;
   displaying the second selected symbol on the second area at a fourth intensity, the fourth intensity contrasting with the third intensity and the second intensity contrasting with the first intensity;
   the viewer, having identified the displayed second selected symbol, providing input to the controller verifying the identity of the displayed second symbol.

8. The method of claim 7 wherein said first and second symbols are alphanumeric characters.

9. The method of claim 8 wherein said first and second symbols are each a series of alphanumeric characters.

10. The method of claim 9 wherein said first area is black and said second area is white.

11. The method of claim 1 including producing on the display a series of symbols at a plurality of respective incrementally different intensities so that the viewer can determine the finest discernible difference in the displayed intensities by identifying the faintest symbol, the identities of the symbols unknown to the viewer until displayed.

12. The method of claim 11 including the step of providing viewer input to the controller to select pixel width of the displayed symbol.

13. The method of claim 11 including the step of providing viewer input to the controller to select contrast gradations of the displayed characters.

14. The method of claim 1 wherein said selected symbol is an alphanumeric character.

15. The method of claim 1 wherein said selected symbol is a series of alphanumeric characters.

* * * * *